US011111448B1

(12) United States Patent
Hitch et al.

(10) Patent No.: US 11,111,448 B1
(45) Date of Patent: Sep. 7, 2021

(54) DECAHYDRONAPHTHALENE AS AN ENDOTHERMIC FUEL FOR HYPERSONIC VEHICLES

(71) Applicant: Reaction Systems Inc., Golden, CO (US)

(72) Inventors: Bradley Dean Hitch, Golden, CO (US); David Thomas Wickham, Lafayette, CO (US); Jeffrey Robert Engel, Golden, CO (US); Jacquelyn Brett Lewis, Denver, CO (US)

(73) Assignee: Reaction Systems Inc., Golden, CO (US)

( * ) Notice: Subject to any disclaimer, the term of this patent is extended or adjusted under 35 U.S.C. 154(b) by 0 days.

(21) Appl. No.: 16/277,627

(22) Filed: Feb. 15, 2019

Related U.S. Application Data

(63) Continuation of application No. 16/251,479, filed on Jan. 18, 2019, now abandoned.

(60) Provisional application No. 62/619,030, filed on Jan. 18, 2018.

(51) Int. Cl.
| *F23K 5/08* | (2006.01) |
| *F23R 3/40* | (2006.01) |
| *F02K 7/14* | (2006.01) |
| *C10L 1/16* | (2006.01) |
| *C10L 1/182* | (2006.01) |

(52) U.S. Cl.
CPC .......... *C10L 1/1608* (2013.01); *C10L 1/1824* (2013.01); *F23K 5/08* (2013.01); *F23R 3/40* (2013.01); *C10L 2200/04* (2013.01); *C10L 2270/04* (2013.01); *F02K 7/14* (2013.01)

(58) Field of Classification Search
CPC combination set(s) only.
See application file for complete search history.

(56) References Cited

U.S. PATENT DOCUMENTS

| 3,012,961 | A | 12/1961 | Weisz |
| 3,126,330 | A | 3/1964 | Zimmerschied et al. |
| 3,236,764 | A | 2/1966 | Herder et al. |
| 3,703,361 | A | 11/1972 | Konecky |
| 4,099,931 | A | 7/1978 | Bryant et al. |
| 4,645,585 | A | 2/1987 | White |
| 5,072,581 | A | 12/1991 | Harshman |
| 5,151,171 | A | 9/1992 | Spadaccini et al. |
| 5,176,814 | A | 1/1993 | Spadaccini et al. |
| 5,223,651 | A | 6/1993 | Stickler et al. |
| 5,232,672 | A | 8/1993 | Spadaccini et al. |
| 5,291,735 | A | 3/1994 | Kesten |
| 5,727,382 | A | 3/1998 | Chevalier et al. |
| 5,954,941 | A | 9/1999 | Mercier et al. |
| 6,715,293 | B2 | 4/2004 | Sillence et al. |
| 7,963,100 | B2 | 6/2011 | Bakos et al. |
| 8,015,823 | B2 | 9/2011 | Vanderspurt et al. |
| 8,127,555 | B2 | 3/2012 | Jarmon et al. |
| 8,484,980 | B1 | 7/2013 | Trefny et al. |
| 8,496,201 | B2 | 7/2013 | Norton et al. |
| 8,978,353 | B2 | 3/2015 | Norton et al. |
| 9,150,300 | B2 | 6/2015 | Vanderspurt et al. |
| 9,745,912 | B2 | 8/2017 | Bergh |
| 10,099,797 | B2 | 10/2018 | Vanderspurt et al. |
| 10,190,540 | B2 | 1/2019 | Suzuki et al. |
| 2004/0107634 | A1* | 6/2004 | Binions .................. C10L 1/328 44/359 |
| 2014/0161689 | A1* | 6/2014 | Chheda .................. C10G 1/002 422/630 |
| 2016/0326448 | A1* | 11/2016 | Bauldreay ................. F02C 7/30 |
| 2018/0230391 | A1* | 8/2018 | Price ........................ C10G 3/42 |

FOREIGN PATENT DOCUMENTS

WO  2017/050687 A1  3/2017

OTHER PUBLICATIONS

U.S. Appl. No. 16/251,479, dated Jan. 18, 2019.
U.S. Appl. No. 16/860,009, dated Apr. 27, 2020.
Agosta (2002) "Development of a Chemical Surrogate for JP-8 Aviation Fuel Using a Pressurized Flow Reactor," Master's Thesis, Dept. Mechanical Engineering, Drexel University, 209 pp.
Chen et al. (2016) "Synthesis of High-Density Jet Fuel with Cyclopentanol," ACS Sustainable Chemistry & Engineering, 4(11), 6160-6166.
Gul et al. (2006) "The Effect of Chemical Composition of Coal-Based Jet Fuels on the Deposit Tendency and Morphology," Energy & Fuels, 20(6), 2478-2485.
Heyne et al. (2009) "Autoignition Studies of trans- and cis-Decalin in an Ignition Quality Tester (IQT) and the Development of a High Thermal Stability Unifuel/Single Battlefield Fuel," Energy & Fuels (2009), 23(12), 5879-5885.
Heyne & Boehman (2009) "Proposed reactivity mechanism for trans- and cisdecalin and implications for the development of JP-900," Preprints of Symposia -American Chemical Society, Division of Fuel Chemistry (2009), 54(1), 41-42.
Jackson et al. (1995) "Test Results of an Endothermic Fuel Reactor," Paper No. AIAA-95-6028, presented at the AIAA Sixth International Aerospace Planes and Hypersonics Technologies Conference.
Jothlmurugesan et al. (1985) "Kinetics of Dehydrogenation of Methylcyclohexane over a Platinum-Rhenium-Alumina Catalyst in the Presence of Added Hydrogen," Ind. Eng. Chern. Fundam. 24: 433-438.
Lander et al. (1971) "Endothermic Fuels for Hypersonic Vehicles," J. Aircraft, 8(4): 200-207.
Pyle (1947) "The Latent Heat of Fusion of cis and trans Decahydronaphthalene" Master's Thesis, Dept. Chemical Engineering, The University of British Columbia, 30 pp.

(Continued)

*Primary Examiner* — Ellen M McAvoy
*Assistant Examiner* — Chantel L Graham
(74) *Attorney, Agent, or Firm* — Leydig, Voit & Mayer, Ltd,

(57) ABSTRACT

Endothermic fuel compositions comprising 50% or more by volume decahydronaphthalene, including cis-decahydronaphthalene, trans-decahydronaphthalene or a mixture thereof, for use as fuels in hypersonic vehicles and particularly for use in dual-mode ramjet or supersonic combustion ramjet air breathing engines.

20 Claims, 1 Drawing Sheet

(56) References Cited

OTHER PUBLICATIONS

Rubey et al. (1987) "Thermal behavior of a model endothermic fuel and identification of degradation products," Proceedings American Chemical Society, Division of Petroleum Chemistry American Chemical Society Meeting (Denver) (1987), 32(2), 526-529.
Schobert et al. (2007) Final Report AFOSR/NA Grant F49620-99-1-0290 available on line from the Defense Technical Information Center at https://apps.dtic.mil/dtic/tr/fulltext/u2/a474564.pdf (40 pages).
Schobert et al. (2009) Final report AFOSR Grant FA9550-07-1-0451 available on line from the Defense Technical Information Center at https://apps.dtic.mil/dtic/tr/fulltext/u2/a530795.pdf (15 pages).
Song et al. (1993) "Pyrolytic Degradation Studies of a Coal-Derived and a Petroleum-Derived Aviation Jet Fuel," Energy & Fuels, 7:234-243.
Strohm et al. (2004) "Improved pyrolytic performance of model JP-900 Jet fuels by binary hydrogen donors," Preprints - American Chemical Society, Division of Petroleum Chemistry (2004), 49(4), 457-460.
Taylor & Rubey (1988) "Evaluation of the Gas-Phase Thermal Decomposition Behavior of Future Jet Fuels," Energy & Fuels, 2(6): 723-728.

\* cited by examiner

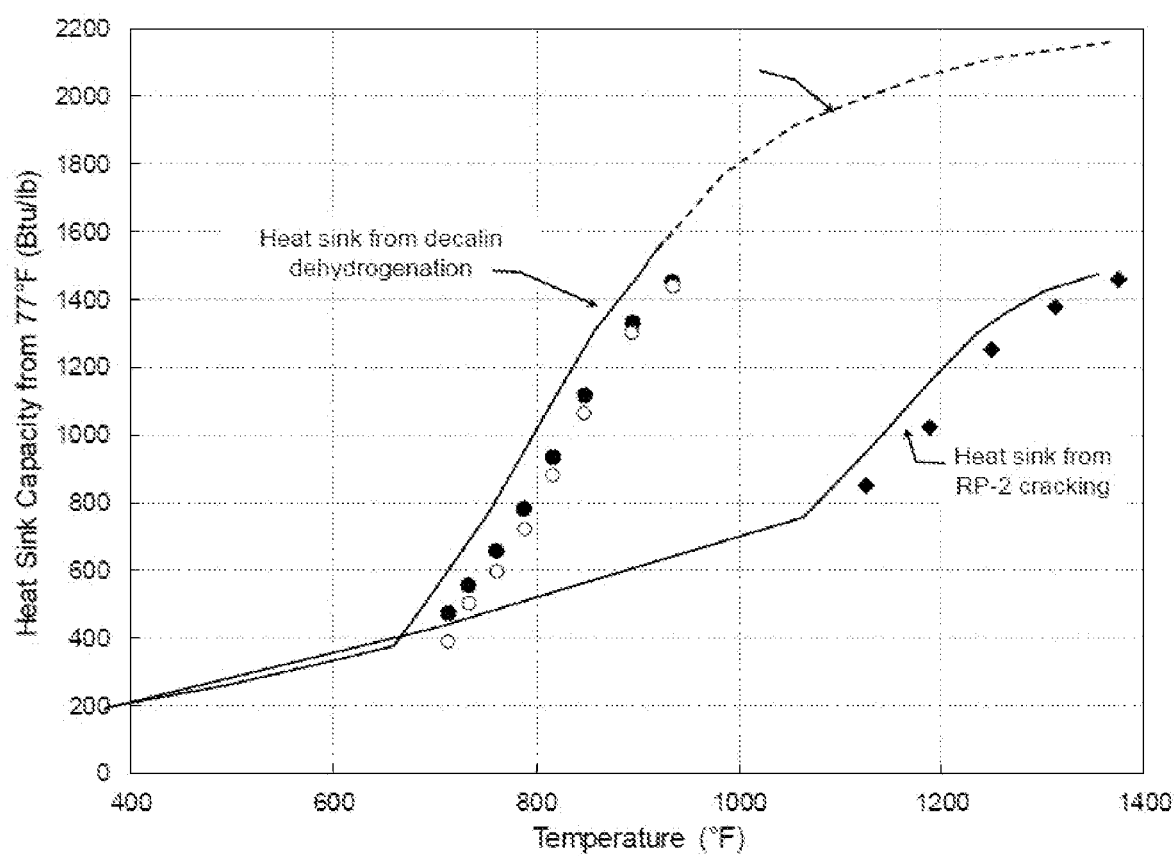

DECAHYDRONAPHTHALENE AS AN ENDOTHERMIC FUEL FOR HYPERSONIC VEHICLES

CROSS-REFERENCE TO RELATED APPLICATIONS

This application is a continuation of U.S. application Ser. No. 16/251,479, filed Jan. 18, 2019, which claims the benefit of U.S. provisional application 62/619,030, filed Jan. 18, 2018, each of which are incorporated by reference herein in its entirety.

BACKGROUND

Hypersonic vehicles are of increasing interest. These vehicles generally incorporate a dual-mode ramjet or supersonic combustion ramjet air breathing engine. This type of jet engine relies on the combustion of fuel and an oxidizer (atmospheric oxygen) to produce thrust. A key technology needed for these vehicles is the ability to cool the combustor by flowing fuel through channels machined in the combustor walls. This also results in preheating of the fuel which often is desirable. An endothermic fuel which can provide cooling, not only through sensible heating, but also provides endothermic cooling through endothermic chemical reactions can be useful in this application. Currently, the cooling capacity of kerosene-based fuels is relatively low even with endothermic cracking reactions, and this limits the Mach number that can be achieved. Moreover, increasing the fuel cooling capacity by raising the fuel flow is not practical because the additional fuel would over-fuel the combustor or have to be dumped overboard, decreasing range. Likewise, allowing the fuel to reach higher temperatures is not attractive because coke formation could lead to heat exchanger failure. Therefore, there is a significant need to develop new endothermic fuels and custom heat exchanger/reactors that can deliver substantially higher heat sink capacities than current military and commercial fuels and technology.

SUMMARY

The invention provides an endothermic fuel which comprises decahydronaphthalene and in more specific embodiments provides an endothermic fuel comprising a mixture of cis and trans decahydronaphthalene. In embodiments, the fuel composition comprises trans and/or cis decahydronaphthalene in combination with 0.01 to 10% by volume of methanol, ethanol, n-propanol or a mixture thereof and/or 1.0 to 25% by volume of methylcyclohexane. Fuel compositions comprising methanol can further comprise a cosolvent to improve methanol solubility in the fuel. In specific embodiments of fuel compositions comprising methanol, the composition further comprises a cosolvent which is present in an amount ranging from 0.5 to 20% by volume of the amount of methanol present. In specific embodiments of fuel compositions comprising methanol, the composition further comprises a cosolvent which is present in an amount ranging from 0.5 to 10% by volume of the amount of methanol present.

In certain jet engine applications, for example, those systems where the vehicle is reusable and takes off from the ground, useful fuel compositions herein are those having a freezing point of −40° F. or less. In other applications, useful fuel compositions herein are those having a freezing point of −65° F. or less.

In certain embodiments, the invention provides a fuel composition comprising a mixture of cis and trans decahydronaphthalene isomers where the weight % of the cis decahydronaphthalene isomer in the mixture of isomers is 20% or more.

In embodiments, the invention provides a fuel composition which comprises 50% or more by volume of a mixture of the cis and trans isomers of decahydronaphthalene, wherein the molar ratio of cis to trans isomers ranges from 3.5 to 1.0 and which optionally comprises 0-3% by volume of tetrahydronaphthalene, 0-3% by volume of naphthalene, 0-10% by volume of methyl alcohol, ethyl alcohol, n-propyl alcohol, or a mixture thereof, and 0-25% by volume of methylcyclohexane. In more specific embodiments, the fuel composition comprises 75% or more by volume of the mixture of cis and trans isomers of decahydronaphthalene. In more specific embodiments, the fuel composition comprises 90% or more by volume of the mixture of cis and trans isomers. In more specific embodiments, the fuel composition comprises 97% or more by volume of the mixture of cis and trans isomers. In more specific embodiments, the fuel composition comprises 99% or more by volume of the mixture of cis and trans isomers. In more specific embodiments, the fuel composition comprises 0.01 to 3% by volume tetrahydronaphthalene. In more specific embodiments, the fuel composition comprises 0.01 to 3% by volume naphthalene. In more specific embodiments, the fuel composition comprises 0.01 to 10% by volume methylcyclohexane, methyl alcohol, ethyl alcohol, propyl alcohol or a mixture of two or more thereof. In more specific embodiments, the fuel composition comprises 1 to 10% by volume methylcyclohexane, methyl alcohol, ethyl alcohol, propyl alcohol or a mixture of two or more thereof. In more specific embodiments, the fuel composition comprises 0.01 to 10% by volume methanol and 0.01 to 25% by volume methylcyclohexane. In more specific embodiments, the fuel composition comprises 1 to 25% by volume methylcyclohexane. In additional embodiments of any of the forgoing embodiments of fuel compositions, the molar ratio of cis to trans decahydronaphthalene ranges from 2.0 to 1.5. In the forgoing embodiments, the freezing point of the fuel composition for certain applications is preferably −40° F. or less. In the forgoing embodiments, the freezing point of the fuel composition for certain applications is preferably −65° F. or less.

The invention also provides a fuel composition which comprises 50% or more by volume of a mixture of the cis and trans isomers of decahydronaphthalene, wherein the molar ratio of cis to trans isomers ranges from 10 to 0.1 and which comprises 0.1 to 10% by volume of methanol, ethanol, n-propanol or a mixture of any two thereof or 1 to 25% by volume of methylcyclohexane and which optionally also comprises 0-3% by volume of tetrahydronaphthalene, and/or 0-3% by volume of naphthalene. In more specific embodiments, the fuel composition comprises 60% or more by volume of the mixture of the cis and trans isomers of decahydronaphthalene. In more specific embodiments, the fuel composition comprises 75% or more by volume of the mixture of the cis and trans isomers of decahydronaphthalene. In more specific embodiments, in the fuel composition, the molar ratio of cis to trans isomers of decahydronaphthalene ranges from 8 to 0.2. In more specific embodiments in the fuel composition, the molar ratio of cis to trans isomers of decahydronaphthalene ranges from 1 to 0.5. In the forgoing embodiments, the freezing point of the fuel composition for certain applications is preferably −40° F. or less. In the forgoing embodiments, the freezing point of the fuel composition for certain applications is preferably −65° F. or less.

The invention also provides a fuel composition which comprises 50% or more by volume of decahydronaphthalene, 1-10% by volume methanol and/or 1-25% by volume methylcyclohexane, wherein decahydronaphthalene is the cis isomer, the trans isomer or a mixture thereof. The invention also provides a fuel composition which comprises 50% or more by volume of decahydronaphthalene, 5-10% by volume methanol and/or 5-25% by volume methylcyclohexane, wherein decahydronaphthalene is the cis isomer, the trans isomer or a mixture thereof. The invention also provides a fuel composition which comprises 50% or more by volume of decahydronaphthalene, and 1-10% by volume methanol, wherein decahydronaphthalene is the cis isomer, the trans isomer or a mixture thereof. The invention also provides fuel a composition which comprises 50% or more by volume of decahydronaphthalene, and 5-25% by volume methylcyclohexane, wherein decahydronaphthalene is the cis isomer, the trans isomer or a mixture thereof. In specific embodiments, the forgoing fuel compositions comprise 60%, 70%, or 75% or more by volume decahydronaphthalene. In the forgoing embodiments, the freezing point of the fuel composition for certain applications is preferably −40° F. or less. In the forgoing embodiments, the freezing point of the fuel composition for certain applications is preferably −65° F. or less.

In specific embodiments, the invention provides a fuel comprising 90% by volume decahydronaphthalene and 10% by volume methanol. In specific embodiments, the invention provides a fuel comprising 75% to 90% by volume decahydronaphthalene and 10-25% by volume methylcyclohexane. In the forgoing embodiments, the freezing point of the fuel composition for certain applications is preferably −40° F. or less. In the forgoing embodiments, the freezing point of the fuel composition for certain applications is preferably −65° F. or less.

In specific embodiments, the invention provides a fuel consisting of decahydronaphthalene, 0-3% by volume tetrahydronaphthalene, 0-3% by volume naphthalene, 0-10% by volume methanol, and 0-25% by volume methylcyclohexane, wherein the freezing point of the fuel composition is −40° F. or is −65° F. or less. In more specific embodiments of these fuel compositions, decahydronaphthalene is present at 50% by volume or more or is present at 75% by volume or more, or is present at 90% or more by volume. In specific embodiments of these fuel compositions, both cis and trans decahydronaphthalene are present. In specific embodiments of these fuel compositions, both cis and trans decahydronaphthalene are present and the ratio of cis to trans isomers is 4 to 0.25. In specific embodiments of these fuel compositions, both cis and trans decahydronaphthalene are present and the ratio of cis to trans isomers is 1 to 0.5.

The invention also provides any of the fuel compositions as described herein for use as an endothermic fuel in a hypersonic vehicle.

The invention additionally provides a method for operating an engine which comprises passing any fuel composition as described herein to the ramjet or scramjet engine and combusting the fuel composition therein. More specifically, the invention provides a method for operating a dual mode ramjet engine in either subsonic or supersonic modes or both. More specifically, the invention provides a method of operating a supersonic combustion ramjet (scramjet). In an embodiment, the method includes passing the fuel composition in contact with a catalyst that is active for dehydrogenation of decahydronaphthalene. In an embodiment, the method includes, after contacting the fuel with a catalyst that is active for dehydrogenation of decahydronaphthalene, sending the products of the dehydrogenation reaction to the combustor.

Other embodiments of the invention will be apparent to one of ordinary skill in the art in view of the following description.

BRIEF DESCRIPTION OF THE FIGURE

FIG. 1 illustrates the heat sink capacity available from the decalin dehydrogenation reaction compared to that available with a kerosene-based jet fuel such as RP-2.

DETAILED DESCRIPTION

This invention relates to an effective endothermic fuel for use in hypersonic vehicles and particularly for use in scramjet engines. Decahydronaphthalene (also called decalin), $C_{10}H_{18}$, has an attractive combination of physical and chemical properties for use as an endothermic fuel. Decahydronaphthalene is inexpensive and available as a mixture of cis and trans isomers or as the individual isomers. The trans isomer and the cis isomer are available. Mixtures of cis and trans isomers of decahydronaphthalene with varying ratios of cis to trans isomers can be prepared by varying the method of preparation of decahydronaphthalene, by preparing mixtures of cis and trans decahydronaphthalene, by application of known methods for separation of the cis and trans isomers or by a combination of such known methods.

In embodiments, fuel compositions herein comprise less than 10% by volume and preferably less than 1% by volume of alkanes, particularly liquid mixtures of alkanes, such as kerosene. More specifically, fuel compositions herein do not comprise any measurable amount of such alkenes, mixtures of alkanes or kerosene.

In embodiments, fuel compositions herein comprise less than 10% by volume and preferably less than 5% by volume of aromatics. In embodiments, fuel compositions herein comprise less than 10% by volume of aromatics. In embodiments, fuel compositions herein comprise less than 10% by volume and preferably less than 1% by volume of aromatics other than tetrahydronaphthalene and naphthalene. It will be understood that decahydronaphthalene in fuel compositions herein when introduced into engines as described herein can generate higher levels of aromatics such as tetrahydronaphthalene and naphthalene which along with unreacted decahydronaphthalene are combusted in the engine. In embodiments, fuel compositions herein comprise less than 10% by volume and preferably less than 1% by volume of olefins.

In embodiments, fuel compositions herein comprise less than 10% by volume and preferably less than 1% by volume of any combination of alkanes; liquid mixtures of alkanes; kerosene, aromatics other than tetrahydronaphthalene and naphthalene; benzene, xylene, methylated aromatics, or olefins.

The volumetric heat of combustion for cis-decalin is 139,035 Btu/gal (38.8 Mj/L) and for trans-decalin is 134,568 Btu/gal (37.5 Mj/L), which are comparable to that of the synthetic military fuel JP-10 of 141,362 Btu/gal (39.4 Mj/L), which is currently considered an attractive fuel. In contrast, decahydronaphthalene has a much higher cooling capacity than JP-10 (tetrahydrocyclopentadiene).

For decahydronaphthalene, both isomers can undergo a dehydrogenation reaction that first produces tetrahydronaphthalene, which in turn is further dehydrogenated to produce naphthalene:

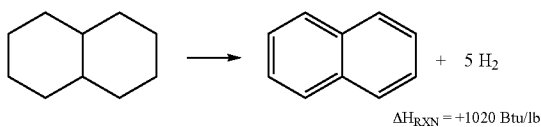

$\Delta H_{RXN} = +1020$ Btu/lb

The dehydrogenation reaction to naphthalene has a heat of reaction of 1020 Btu/lb and also produces five moles of hydrogen per mole of decahydronaphthalene. Moreover, at typical fuel pressures of 500 psig or more, the equilibrium established allows the reaction to reach high conversions at relatively low temperatures, e.g., below 1000° F., where coke deposition does not occur.

In an embodiment, the invention provides a fuel comprising a mixture of the cis and trans isomers of decahydronaphthalene with the mixture ranging from 50% by weight cis-decahydronaphthalene and 50% by weight trans-decahydronaphthalene to 75% by weight cis-decahydronaphthalene and 25% by weight trans-decahydronaphthalene, inclusive, possessing a freeze point less than or equal to −65° F. for use as an endothermic fuel in hypersonic vehicles. The endothermic fuel absorbs excess heat by undergoing an endothermic reaction in which the isomers of decahydronaphthalene react in the presence of a catalyst to form tetrahydronaphthalene, naphthalene and hydrogen, and these products along with any decahydronaphthalene that does not react are then burned in the vehicle combustor to provide thrust or propulsion. Additional components can be added to the forgoing fuel to increase volatility, increase overall chemical heat sink capacity, or decrease the temperature at which the chemical heat sink is available. Exemplary additional components include among others, methanol, ethanol, n-propanol or methylcyclohexane. Further in addition a cosolvent can be added to improve solubility of other fuel components. In embodiments the kinematic viscosities of the fuel are 50 cSt or less at −65° F.

Jet fuels are generally complex mixtures of many different hydrocarbon compounds. At the freezing point of a fuel mixture the formation of wax crystals by some of the higher molecular weight compounds can create a slush that impedes pumping of the fuel from the fuel tank to the combustor. To avoid this problem, the freezing point specification for such fuels is set as −65° F. (−54° C.)[see: U.S. Pat. No. 4,099,931]. The freezing points of the individual decahydronaphthalene isomers are both well above this freezing point specification with that of cis-decalin being −45.9° F. and that of trans-decalin being −23.2° F. One of ordinary skill in the art, based on the freezing points of the isomers would understand that a mixture of these two isomers would also have a freezing point that is above −65° F. However, mixtures of these isomers have been reported [G. Pyle (1947) "The Latent Heat of Fusion of cis and trans Decahydronaphthalene" Master's Thesis, Dept. Chemical Engineering, The University of British Columbia] to have freezing points that are lower than the individual compounds. A eutectic mixture is reported at a composition of 65.2 weight % cis and 34.8 weight % trans (molar ratio of cis/trans of 1.78) to have a freezing point of −74.9° F. This work suggested that a relatively wide range of mixtures, from 50% cis and 50% trans to 78% cis and 22% trans will have a freezing point of −65° F. or less.

Certain fuel compositions of the invention can be used in jet engine applications which require a freezing point of −40° F. or less. This specification can generally be met employing mixtures of cis and trans decahydronaphthalene in which the cis isomer represents 20% by weight or more of the mixture of isomers. Fuel compositions comprising decahydronaphthalene isomers in which the cis isomer represents 20% by weight or more of the mixture of isomers need not contain fuel compound additives to further lower the freezing point.

Certain mixtures of the decahydronaphthalene isomers also have acceptable viscosities of less than 50 cSt at −65° F. (−54° C.). More generally, certain fuel compositions of the invention have viscosities of less than 50 cSt at −65° F.

In specific embodiments, the invention provides a fuel composition comprising a mixture of decahydronaphthalene cis and trans isomers where the molar ratio of the cis isomer to the trans isomer ranges from 3.5 to 1.0. More specifically, the invention provides a fuel composition comprising a mixture of decahydronaphthalene cis and trans isomers where the molar ratio of the cis isomer to the trans isomer ranges from 3.0 to 1.5. More specifically, the invention provides a fuel composition comprising a mixture of decahydronaphthalene cis and trans isomers where the molar ratio of the cis isomer to the trans isomer ranges from 2.5 to 1.5. More specifically, the invention provides a fuel composition comprising a mixture of decahydronaphthalene cis and trans isomers where the molar ratio of the cis isomer to the trans isomer ranges from 2.0 to 1.5. More specifically, the invention provides a fuel composition comprising a mixture of decahydronaphthalene cis and trans isomers where the molar ratio of the cis isomer to the trans isomer ranges from 1.9 to 1.7. More specifically, the invention provides a fuel composition comprising a mixture of decahydronaphthalene cis and trans isomers where the molar ratio of the cis isomer to the trans isomer is 1.8+/−10%.

In specific embodiments, the fuel composition comprises 50% or more by volume of the total volume of the fuel composition of a mixture of decahydronaphthalene isomers wherein the ratio of cis to trans isomers of the decahydronaphthalene is within the ranges noted above. In specific embodiments, the fuel composition comprises 55% or more by volume of the total volume of the fuel composition of a mixture of decahydronaphthalene isomers wherein the ratio of cis to trans isomers of the decahydronaphthalene is within the ranges noted above. In specific embodiments, the fuel composition comprises 60% or more by volume of the total volume of the fuel composition of a mixture of decahydronaphthalene isomers wherein the ratio of cis to trans isomers of the decahydronaphthalene is within the ranges noted above. In specific embodiments, the fuel composition comprises 70% or more by volume of the total volume of the fuel composition of a mixture of decahydronaphthalene isomers wherein the ratio of cis to trans isomers of the decahydronaphthalene is within the ranges noted above. In specific embodiments, the fuel composition comprises 80% or more by volume of the total volume of the fuel composition of a mixture of decahydronaphthalene isomers wherein the ratio of cis to trans isomers of the decahydronaphthalene is within the ranges noted above. In specific embodiments, the fuel composition comprises 90% or more by volume of the total volume of the fuel composition of a mixture of decahydronaphthalene isomers wherein the ratio of cis to trans isomers of the decahydronaphthalene is within the ranges noted above. In specific embodiments, the fuel composition comprises 95% or more by volume of the total volume of the fuel composition of a mixture of decahydronaphthalene isomers wherein the ratio of cis to trans isomers of the decahydronaphthalene is within the ranges noted above. In specific embodiments, the fuel composition comprises 97% or more by volume of the total volume of the fuel composition of a mixture of decahydronaphthalene isomers wherein the ratio of cis to trans isomers of the decahydronaphthalene is within the ranges noted above. In specific embodiments, the fuel composition comprises 98% or more by volume of the total volume of the fuel composition of a mixture of decahydronaphthalene isomers wherein the ratio of cis to trans isomers of the decahydronaphthalene is within the ranges noted above. In specific embodiments, the fuel composition comprises 99% or more by volume of the total volume of the fuel composition of a mixture of decahydronaphthalene isomers wherein the ratio of cis to trans isomers of the decahydronaphthalene is within the ranges noted above. In specific embodiments, the fuel composition comprises 99.5% or more by volume of the total volume of the fuel composition of a mixture of decahydronaphthalene isomers wherein the ratio of cis to trans isomers of the decahydronaphthalene is within the ranges noted above. In specific embodiments, the fuel composition comprises 99.9% or more by volume of the total volume of the fuel composition of a mixture of decahydronaphthalene isomers wherein the ratio of cis to trans isomers of the decahydronaphthalene is within the ranges noted above.

In specific embodiments, the fuel composition comprises 50% or more by volume of decahydronaphthalene, 0 to 3% by volume of tetrahydronaphthalene and/or 0 to 3% by volume of naphthalene. In specific embodiments, the fuel composition comprises 60% or more by volume of decahydronaphthalene, 0 to 3% by volume of tetrahydronaphthalene and/or 0 to 3% of by volume naphthalene. In specific embodiments, the fuel composition comprises 70% or more by volume of decahydronaphthalene, 0 to 3% by volume of tetrahydronaphthalene and/or 0 to 3% by volume of naphthalene. In specific embodiments, the fuel composition comprises 80% by volume or more of decahydronaphthalene, 0 to 3% by volume of tetrahydronaphthalene and/or 0 to 3% by volume of naphthalene. In specific embodiments, the fuel composition comprises 90% by volume or more of decahydronaphthalene, 0 to 3% by volume of tetrahydronaphthalene and/or 0 to 3% by volume of naphthalene. In specific embodiments, the fuel composition comprises 94% or more by volume of decahydronaphthalene, 0 to 3% by volume of tetrahydronaphthalene and/or 0 to 3% by volume of naphthalene. In specific embodiments, the fuel composition comprises 96% or more by volume of decahydronaphthalene, 0 to 3% by volume of tetrahydronaphthalene and/or 0 to 3% by volume of naphthalene. In specific embodiments, the fuel composition comprises 97% or more by volume of decahydronaphthalene, 0 to 3% by volume of tetrahydronaphthalene and/or 0 to 3% by volume of naphthalene. In specific embodiments, the fuel composition comprises 98% or more by volume of decahydronaphthalene, 0 to 2% by volume of tetrahydronaphthalene and/or 0 to 2% by volume of naphthalene. In specific embodiments, the fuel composition comprises 99% or more by volume of decahydronaphthalene, 0 to 1% by volume of tetrahydronaphthalene and/or 0 to 1% by volume of naphthalene. In specific embodiments, the fuel compositions herein comprise less than 1% by volume of tetrahydronaphthalene and/or naphthalene. In specific embodiments, the fuel compositions herein comprise less than 0.5% by volume of tetrahydronaphthalene and/or naphthalene. In specific embodiments, the fuel compositions herein comprise less than 0.1% by volume of tetrahydronaphthalene and/or naphthalene. In the forgoing embodiments, % volume is with respect to the total volume of the fuel composition.

In specific embodiments, useful fuel compositions herein have a freezing point of −40° F. or less. In specific embodiments, useful fuel compositions herein have a freezing point of −65° F. or less. In specific embodiments, useful fuel compositions herein have a freezing point of −67° F. or less. In specific embodiments, useful fuel compositions herein have a freezing point of −70° F. or less. In specific embodiments, useful fuel compositions herein have a freezing point of −73° F. or less. In specific embodiments, useful fuel compositions herein have a freezing point of −76° F. or less.

In specific embodiments, the invention provides a fuel composition in which the fuel components consist of a mixture of decahydronaphthalene cis and trans isomers wherein the ratio of cis to trans isomer ranges from 3.5 to 1.0. More specifically, the invention provides a fuel composition in which the fuel components consist of a mixture of decahydronaphthalene cis and trans isomers where the molar ratio of the cis isomer to the trans isomer ranges from 3.0 to 1.5. More specifically, the invention provides a fuel composition in which the fuel components consist of a mixture of decahydronaphthalene cis and trans isomers where the molar ratio of the cis isomer to the trans isomer ranges from 2.5 to 1.5. More specifically, the invention provides a fuel composition wherein the fuel components consist of a mixture of decahydronaphthalene cis and trans isomers where the molar ratio of the cis isomer to the trans isomer ranges from 2.0 to 1.5. More specifically, the invention provides a fuel composition wherein the fuel components consist of a mixture of decahydronaphthalene cis and trans isomers where the molar ratio of the cis isomer to the trans isomer ranges from 1.9 to 1.7. More specifically, the invention provides a fuel composition wherein the fuel components consist of a mixture of decahydronaphthalene cis and trans isomers where the molar ratio of the cis isomer to the trans isomer is 1.8+/−10%.

In specific embodiments, the invention provides fuel compositions in which the fuel components consist of a mixture of decahydronaphthalene cis and trans isomers, wherein the ratio of cis to trans isomers is as noted above, 0-3% by volume tetrahydronaphthalene and 0-3% by volume of naphthalene, where % volume is with respect to total volume of the fuel composition.

Additional fuel compounds can be blended into mixtures of decahydronaphthalene isomers, for example, to reduce the freezing point (FP) of the fuel and or to enhance endothermic cooling. For example, methylcyclohexane (MCH, FP=−195° F.), methanol (MeOH, FP=−143° F.), ethanol (EtOH, FP=−174° F.), or n-propanol (POH, FP=−196° F.) or a mixture of two or more thereof can be added to the fuel composition as a fuel component in combination with a mixture of decahydronaphthalene isomers. Addition of one or more of these compounds to the fuel composition can also increase the volatility of the fuel.

Additionally, a cosolvent is optionally added to a fuel composition containing one or more fuel compounds in addition to decahydronaphthalene to improve the solubility of the additional fuel compound or a mixture of such compounds in the fuel composition. The amount of cosolvent added is the amount needed to facilitate improved solubility and typically is less than 10% by volume of the total amount of the additional fuel components. Exemplary cosolvents include, among others, acetone, methyl ethyl ketone, or an alcohol having 3 or more carbon atoms, such as propanol or butanol. Cosolvents for use with added methanol, include among others, acetone, methyl ethyl ketone, propanol (which may be a mixture of isomers) or butanol (which may be a mixture of isomers). In specific embodiments, cosolvent is added in an amount of 0.1 to 10% by volume of the total volume of additional fuel components. In specific embodiments, cosolvent is added in an amount of 1 to 10% by volume of the total volume of additional fuel components. In specific embodiments, cosolvent is added in an amount of 2 to 10% by volume of the total volume of additional fuel components. In specific embodiments, cosolvent is added in an amount of 2 to 5% by volume of the total volume of additional fuel components. In specific embodiments, when methanol is added to the fuel composition, cosolvent is added in an amount of 0.1 to 10% by volume of the total volume of methanol. In specific embodiments, when methanol is added to the fuel composition, cosolvent is added in an amount of 1 to 10% by volume of the total volume of methanol. In specific embodiments, when methanol is added to the fuel composition, cosolvent is added in an amount of 2 to 10% by volume of the total volume of methanol. In specific embodiments, when methanol is added to the fuel composition, cosolvent is added in an amount of 2 to 5% by volume of the total volume of methanol.

The dehydrogenation of methanol is also very endothermic, with a heat of reaction of 1205 Btu/lb. Therefore, in addition to lowering the freezing point of a decahydronaphthalene mixture, the addition of methanol also increases the overall heat sink capacity of the fuel. Moreover, at the high pressures expected in a fuel system of at least 500 psig, the equilibrium conversion of methanol to carbon monoxide and hydrogen is over 90% at 600° F., which is a lower temperature than is required for decahydronaphthalene to achieve the same level of conversion. Therefore, cooling is obtained at lower temperatures, if methanol is added to decahydronaphthalene.

In specific embodiments, fuel compositions herein comprise 70% or more by volume of a mixture of decahydronaphthalene isomers and one or more of MCH, MeOH, EtOH or POH, wherein the total volume of MCH, MeOH, EtOH, POH or any mixture thereof is 1-10% by volume of the total volume of the fuel composition. The molar ratio of cis to trans decahydronaphthalene in such fuel compositions ranges from 10 to 0.1. In specific embodiments of such fuel compositions, the molar ratio of cis to trans decahydronaphthalene ranges from 8 to 0.2. In specific embodiments of such fuel compositions, the molar ratio of cis to trans decahydronaphthalene ranges from 7 to 0.3. In specific embodiments of such fuel compositions, the molar ratio of cis to trans decahydronaphthalene ranges from 6 to 0.4. In specific embodiments of such fuel compositions, the molar ratio of cis to trans decahydronaphthalene ranges from 5 to 0.5. In specific embodiments of such fuel compositions, the molar ratio of cis to trans decahydronaphthalene ranges from 4 to 0.6. In specific embodiments of such fuel compositions, the molar ratio of cis to trans decahydronaphthalene ranges from 3 to 0.7. In specific embodiments of such fuel compositions, the molar ratio of cis to trans decahydronaphthalene ranges from 2 to 0.8. In specific embodiments of such fuel compositions, the molar ratio of cis to trans decahydronaphthalene ranges from 1 to 0.5. In specific embodiments of such fuel compositions, the molar ratio of cis to trans decahydronaphthalene ranges from 0.8 to 0.6.

In specific embodiments, fuel compositions herein comprise 80% or more by volume of a mixture of decahydronaphthalene isomers and one or more of MCH, MeOH, EtOH or POH, wherein the total volume of MCH, MeOH, EtOH, POH or any mixture thereof is 1-10% by volume of the total volume of the fuel composition. The molar ratio of cis to trans decahydronaphthalene in such fuel compositions can range from 10 to 0.1. In specific embodiments of such fuel compositions, the molar ratio of cis to trans decahydronaphthalene ranges from 8 to 0.2. In specific embodiments of such fuel compositions, the molar ratio of cis to trans decahydronaphthalene ranges from 7 to 0.3. In specific embodiments of such fuel compositions, the molar ratio of cis to trans decahydronaphthalene ranges from 6 to 0.4. In specific embodiments of such fuel compositions, the molar ratio of cis to trans decahydronaphthalene ranges from 5 to 0.5. In specific embodiments of such fuel compositions, the molar ratio of cis to trans decahydronaphthalene ranges from 4 to 0.6. In specific embodiments of such fuel compositions, the molar ratio of cis to trans decahydronaphthalene ranges from 3 to 0.7. In specific embodiments of such fuel compositions, the molar ratio of cis to trans decahydronaphthalene ranges from 2 to 0.8. In specific embodiments of such fuel compositions, the molar ratio of cis to trans decahydronaphthalene ranges from 1 to 0.5. In specific embodiments of such fuel compositions, the molar ratio of cis to trans decahydronaphthalene ranges from 0.8 to 0.6.

In specific embodiments, fuel compositions herein comprise 90% or more by volume of a mixture of decahydronaphthalene isomers and one or more of MCH, MeOH, EtOH or POH, wherein the total volume of MCH, MeOH, EtOH, POH or any mixture thereof is 1-10% by volume of the total volume of the fuel composition. The molar ratio of cis to trans decahydronaphthalene in such fuel compositions can range from 10 to 0.1. In specific embodiments of such fuel compositions, the molar ratio of cis to trans decahydronaphthalene ranges from 8 to 0.2. In specific embodiments of such fuel compositions, the molar ratio of cis to trans decahydronaphthalene ranges from 7 to 0.3. In specific embodiments of such fuel compositions, the molar ratio of cis to trans decahydronaphthalene ranges from 6 to 0.4. In specific embodiments of such fuel compositions, the molar ratio of cis to trans decahydronaphthalene ranges from 5 to 0.5. In specific embodiments of such fuel compositions, the molar ratio of cis to trans decahydronaphthalene ranges from 4 to 0.6. In specific embodiments of such fuel compositions, the molar ratio of cis to trans decahydronaphthalene ranges from 3 to 0.7. In specific embodiments of such fuel compositions, the molar ratio of cis to trans decahydronaphthalene ranges from 2 to 0.8. In specific embodiments of such fuel compositions, the molar ratio of cis to trans decahydronaphthalene ranges from 1 to 0.5. In specific embodiments of such fuel compositions, the molar ratio of cis to trans decahydronaphthalene ranges from 0.8 to 0.6.

In specific embodiments, fuel compositions herein comprise 95% or more by volume of a mixture of decahydronaphthalene isomers and one or more of MCH, MeOH, EtOH or POH, wherein the total volume of MCH, MeOH, EtOH, POH or any mixture thereof is 1-5% by volume of the total volume of the fuel composition. The molar ratio of cis to trans decahydronaphthalene in such fuel compositions can range from 10 to 0.1. In specific embodiments of such fuel compositions, the molar ratio of cis to trans decahydronaphthalene ranges from 8 to 0.2. In specific embodiments of such fuel compositions, the molar ratio of cis to trans decahydronaphthalene ranges from 7 to 0.3. In specific embodiments of such fuel compositions, the molar ratio of cis to trans decahydronaphthalene ranges from 6 to 0.4. In specific embodiments of such fuel compositions, the molar ratio of cis to trans decahydronaphthalene ranges from 5 to 0.5.

In specific embodiments of such fuel compositions, the molar ratio of cis to trans decahydronaphthalene ranges from 4 to 0.6. In specific embodiments of such fuel compositions, the molar ratio of cis to trans decahydronaphthalene ranges from 3 to 0.7. In specific embodiments of such fuel compositions, the molar ratio of cis to trans decahydronaphthalene ranges from 2 to 0.8. In specific embodiments of such fuel compositions, the molar ratio of cis to trans decahydronaphthalene ranges from 1 to 0.5. In specific embodiments of such fuel compositions, the molar ratio of cis to trans decahydronaphthalene ranges from 0.8 to 0.6.

In specific embodiments, the invention provides a fuel composition comprising 0-10% by volume MeOH, 0-25% by volume MCH and 50% by volume or more of decahydronaphthalene. In these embodiments, decahydronaphthalene is the cis isomer, the trans isomer or a mixture of isomers. When a mixture of cis and trans decahydronaphthalene isomers is present, the molar ratio of cis to trans isomer ranges from 10 to 0.1. In these embodiments, if a mixture of decahydronaphthalene isomers is present the molar ratio of cis to trans isomer ranges from 4 to 0.25. More specifically, if a mixture of decahydronaphthalene isomers is present the molar ratio of cis to trans isomer ranges from 2 to 0.5. More specifically, if a mixture of decahydronaphthalene isomers is present the molar ratio of cis to trans isomer ranges from 1 to 0.5. More specifically, if a mixture of decahydronaphthalene isomers is present the molar ratio of cis to trans isomer ranges from 0.8 to 0.5. More specifically, if a mixture of decahydronaphthalene isomers is present the molar ratio of cis to trans isomer ranges from 0.7 to 0.6. In specific embodiments, these compositions comprise 60% or more of decahydronaphthalene. In specific embodiments, these compositions comprise 70% or more of decahydronaphthalene. In specific embodiments, these compositions comprise 75% or more of decahydronaphthalene. In specific embodiments, these compositions comprise 85% or more of decahydronaphthalene. In specific embodiments, these compositions comprise 90% or more of decahydronaphthalene. In specific embodiments, these compositions comprise 95% or more of decahydronaphthalene.

In specific embodiments, the invention provides a fuel composition comprising 10 to 25% by volume of MCH and 50% by volume or more of decahydronaphthalene. In these embodiments, the decahydronaphthalene can be the cis isomer or the trans isomer or a mixture thereof. More specifically, the fuel composition can comprise 10-25% by volume of MCH and 60% by volume or more of decahydronaphthalene. More specifically, the fuel composition can comprise 10-25% by volume of MCH and 70% by volume or more of decahydronaphthalene. More specifically, the fuel composition can comprise 10-25% by volume of MCH and 75% by volume or more of decahydronaphthalene. More specifically, the fuel composition can comprise 10-20% by volume of MCH and 80% by volume or more of decahydronaphthalene. In yet more specific embodiments, the fuel composition comprises 8-12% by volume of MCH and 88-92% by volume of decahydronaphthalene. More specifically, the fuel composition comprises 18-22% by volume of MCH and 72-78% by volume of decahydronaphthalene. More specifically, the fuel composition comprises 24-26% by volume of MCH and 74-76% by volume of decahydronaphthalene. In these embodiments, if a mixture of decahydronaphthalene isomers is present the molar ratio of cis to trans isomer ranges from 10 to 0.1. In these embodiments, if a mixture of decahydronaphthalene isomers is present the molar ratio of cis to trans isomer ranges from 4 to 0.25. More specifically, if a mixture of decahydronaphthalene isomers is present the molar ratio of cis to trans isomer ranges from 2 to 0.5. More specifically, if a mixture of decahydronaphthalene isomers is present the molar ratio of cis to trans isomer ranges from 1 to 0.5. More specifically, if a mixture of decahydronaphthalene isomers is present the molar ratio of cis to trans isomer ranges from 0.8 to 0.5. More specifically, if a mixture of decahydronaphthalene isomers is present the molar ratio of cis to trans isomer ranges from 0.7 to 0.6. In more specific embodiments, the invention provides a fuel composition comprising 10 to 25% by volume of MCH and 60% by volume or more of decahydronaphthalene. In more specific embodiments, the invention provides a fuel composition comprising 10 to 25% by volume of MCH and 70% by volume or more of decahydronaphthalene. In more specific embodiments, the invention provides a fuel composition comprising 10 to 25% by volume of MCH and 75% by volume or more of decahydronaphthalene. In more specific embodiments, the invention provides a fuel composition comprising 10 to 20% by volume of MCH and 80% by volume or more of decahydronaphthalene. In more specific embodiments, the invention provides a fuel composition comprising 10 to 15% by volume of MCH and 85% by volume or more of decahydronaphthalene.

In embodiments herein, fuel compositions consist of decahydronaphthalene, 0 to 3% by volume tetrahydronaphthalene, 0 to 3% by volume naphthalene, and 0 to 10% by volume of MCH, MeOH, EtOH or POH or a mixture thereof, wherein the molar ratio of cis to trans isomers of decahydronaphthalene ranges from ranges from 10 to 0.1 and wherein the total volume of these components is 100%. More specifically, in such fuel compositions, the molar ratio of cis to trans decahydronaphthalene ranges from 8 to 0.2. More specifically in such fuel compositions, the molar ratio of cis to trans decahydronaphthalene ranges from 7 to 0.3. More specifically in such fuel compositions, the molar ratio of cis to trans decahydronaphthalene ranges from 6 to 0.4. More specifically in such fuel compositions, the molar ratio of cis to trans decahydronaphthalene ranges from 5 to 0.5. More specifically in such fuel compositions, the molar ratio of cis to trans decahydronaphthalene ranges from 4 to 0.6. Moe specifically in such fuel compositions, the molar ratio of cis to trans decahydronaphthalene ranges from 3 to 0.7. More specifically in such fuel compositions, the molar ratio of cis to trans decahydronaphthalene ranges from 2 to 0.8. More specifically in such fuel compositions, the molar ratio of cis to trans decahydronaphthalene ranges from 1 to 0.5. More specifically in such fuel compositions, the molar ratio of cis to trans decahydronaphthalene ranges from 0.8 to 0.6.

In embodiments herein, fuel compositions consist of decahydronaphthalene, 0 to 3% by volume tetrahydronaphthalene, 0 to 3% by volume naphthalene, and 10-25% volume of MCH, wherein decahydronaphthalene is the trans isomer, the cis isomer or a mixture of cis and trans isomers and wherein the total volume of these components is 100%. In these embodiments, when a mixture of isomers of decahydronaphthalene is present, the molar ratio of cis to trans isomers of decahydronaphthalene ranges from 10 to 0.1.

In these embodiments, if a mixture of decahydronaphthalene isomers is present the molar ratio of cis to trans isomers ranges from 4 to 0.25. More specifically, if a mixture of decahydronaphthalene isomers is present the molar ratio of cis to trans isomers ranges from 2 to 0.5. More specifically, if a mixture of decahydronaphthalene isomers is present the molar ratio of cis to trans isomers ranges from 1 to 0.5. More specifically, if a mixture of decahydronaphthalene isomers is present the molar ratio of cis to trans isomers ranges from 0.8 to 0.5. More specifically, if a mixture of decahydronaphthalene isomers is present the molar ratio of cis to trans isomers ranges from 0.7 to 0.6.

The endothermic dehydrogenation of decahydronaphthalene can be facilitated by use of a catalyst. The catalyst can be provided in a variety of configurations in order to provide cooling for the combustor. The catalyst can be contained in the catalytic heat exchanger/reactor in a number of configurations. The catalyst can, for example, be coated on an inside surface of the catalytic heat exchanger/reactor in a wall-mounted configuration or loaded into the catalytic heat exchanger/reactor as particles in a packed bed configuration.

The catalyst can, in a specific example, be loaded into a panel made by additive manufacturing, which contains channels for fuel flow that are designed to implement heat transfer through the plate and into the fuel flow. For example, the panel containing catalyst could be a wall or a part of a wall of the combustor or exhaust nozzle.

The catalyst can also be contained in a fuel panel like that described above but which is modified to allow hot air to go through the panel and provide film transpiration cooling for the combustor. The air passes through small passages that are close to the fuel channels allowing the air to be cooled by the endothermic reaction.

Various catalysts are known in the art which are active for decahydronaphthalene dehydrogenation. Useful catalysts include platinum supported on various substrates, such as platinum supported on high surface area $SiO_2$, platinum supported on high surface area alumina. A specific useful catalyst is platinum supported on aluminum hexaaluminates.

Platinum supported on aluminum hexaaluminates is active for decahydronaphthalene dehydrogenation and is stable at high temperatures where reaction rates are high enough to support the very high heat fluxes needed. Decahydronaphthalene to naphthalene conversions of up to 90% were obtained at weight hourly space velocities of up to 2,000 g fuel/(g cat h) or 2,000 $h^{-1}$ with such catalysts and the activity was stable for periods of several hours. It was also shown that the catalyst activity of such catalysts was stable without hydrogen co-flow.

Platinum catalysts active for dehydrogenation of decahydronaphthalene are reported for example in Gates, B. C., J. R. Katzer, and G. C. A. Schuit (1979). Chemistry of Catalytic Processes, McGraw-Hill, New York; Jackson, K, E. Corporan, P. Buckley, and J. Leingang, M. Karpuk, J. Dippo, B. Hitch, D. Wickham, and T. Yee (1995) "Test Results of an Endothermic Fuel Reactor," Paper No. AIAA-95-6028, presented at the AIAA Sixth International Aerospace Planes and Hypersonics Technologies Conference. Jothlmurugesan, K., Subhash Bhatia, and Rameshwar D. Srivastava (1985). "Kinetics of Dehydrogenation of Methylcyclohexane over a Platinum-Rhenium-Alumina Catalyst in the Presence of Added Hydrogen", Ind. Eng. Chem. Fundam. 24, pp. 433-438; and Lander, H. and A. C. Nixon (1971). "Endothermic Fuels for Hypersonic Vehicles", *J. Aircraft,* 8(4), pp. 200-207. Each of these references is incorporated by reference herein in its entirety for disclosure with respect to catalysts and methods of making and using catalysts for dehydrogenation of decahydronaphthalene.

The heat sink capacity of decahydronaphthalene can be increased to over 2000 Btu/lb by heating the products of the dehydrogenation reaction to temperatures above 1400° F. Naphthalene is stable at these temperatures and no sign of decomposition was observed at up to 1465° F. Therefore, at this temperature range e.g., up to 1465° F. and more specifically between 1400° F. to 1465° F., the risk of plugging the fuel flow paths from coke deposition is significantly lower, when using decahydronaphthalene, than when using kerosene based fuels, such as RP-2 or JP-7.

Experiments have been conducted to demonstrate that the reactants and the products of the dehydrogenation reaction (decahydronaphthalene, tetrahydronaphthalene, and naphthalene) all have higher premixed, laminar flame speeds than JP-7 (low volatility, turbine fuel, see specification MIL-DTL-38219D (August 1998) available from the web site everyspec.com). These compounds also have higher non-premixed extinction strain rates compared to JP-7. Both of these characteristics demonstrate that these compounds have better combustion properties than JP-7. Moreover, the dehydrogenation reaction of decahydronaphthalene also produces $H_2$ and when it is combined with the mixtures of decahydronaphthalene, tetrahydronaphthalene, and naphthalene at concentrations expected at various conversion levels, the combustion properties measured by premixed laminar flame speed and non-premixed extinction strain rate are improved over and become much better than those of JP-7.

All references throughout this application, for example patent documents including issued or granted patents or equivalents; patent application publications; and non-patent literature documents or other source material; are hereby incorporated by reference herein in their entireties, as though individually incorporated by reference.

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art.

When a Markush group or other grouping is used herein, all individual members of the group and all combinations and subcombinations possible of the group are intended to be individually included in the disclosure.

Every formulation or combination of components described or exemplified can be used to practice the invention, unless otherwise stated. Specific names of compounds are intended to be exemplary, as it is known that one of ordinary skill in the art can name the same compounds differently. When a compound is described herein such that a particular isomer or enantiomer of the compound is not specified, for example, in a formula or in a chemical name, that description is intended to include each isomer and enantiomer of the compound described individually or in any combination.

One of ordinary skill in the art will appreciate that methods, reagents, catalysts, and device elements other than those specifically exemplified can be employed in the practice of the invention without resort to undue experimentation. All art-known functional equivalents, of any such methods, reagents, catalysts and device elements, are intended to be included in this invention. Whenever a range is given in the specification, for example, a temperature range, a time range, or a composition range, the range is inclusive and all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Herein the term consisting essentially of refers to endothermic fuel components and does not exclude non-fuel additives, which may include cosolvents as described herein or other fuel additives that do not function as an endothermic fuel.

Any recitation herein of the term "comprising", particularly in a description of components of a composition or in a description of elements of a device, is understood to encompass those compositions and methods consisting essentially of (as defined herein) and consisting of the recited components or elements. The invention illustratively described herein suitably may be practiced in the absence of any element or elements, limitation or limitations which is not specifically disclosed herein.

Without wishing to be bound by any particular theory, there can be discussion herein of beliefs or understandings of underlying principles relating to the invention. It is recognized that regardless of the ultimate correctness of any mechanistic explanation or hypothesis, an embodiment of the invention can nonetheless be operative and useful.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention.

THE EXAMPLE

Fuel heat sink capacity of a mixture of decahydronaphthalene isomers 40% cis and 60% trans were measured in a laboratory scale test system. The catalyst was loaded into an additively manufactured 2-in×2-in panel that had a thickness of 0.375-in. The panel contained a single channel that was 25-in long, 0.133-in wide at the base and 0.28-in tall. The channel, which contained the decalin dehydrogenation catalyst went back and forth across the length of the plate, making a total of 14 passes. A high temperature furnace provided heat to one side of the panel. Decalin was directed through a preheater that raised its temperature to 600° F. before it entered the panel and contacted the catalyst. Heat sink capacity measurements were made by exposing the panel to the high temperature from the furnace, flowing decalin through the channel, and measuring the temperature of flow at the end of the catalyst bed. This reactor configuration allowed two independent measurements of heat sink capacity. One determination relied on measuring the heat flux produced by the furnace, and the feed flow rate to calculate fuel heat sink capacity. Heat sink capacity was also calculated by measuring the composition and temperature of the product stream, and calculating the increase in enthalpy compared to that of the feed flow. These two independent measurements demonstrate that the heat sink capacity of decahydronaphthalene can reach values of up to 1454 Btu/lb at a temperature of 935° F. This value is much higher than can be obtained with kerosene-based fuels at this temperature.

More specifically, FIG. 1 illustrates the heat sink capacity available from the decalin dehydrogenation reaction compared to that available with a kerosene-based jet fuel such as RP-2. From ambient temperature up to approximately 700° F., the only cooling capacity available from either fuel is that produced by sensible heating and no endothermic reactions occur over this temperature range. However, at higher temperatures the heat sink capacity from decalin dehydrogenation produces a sharp change in slope and the heat capacity increases rapidly up to temperatures of 935° F. The solid and open circles in the FIGURE are heat sink capacity measurements made using a catalytic reactor filled with decalin dehydrogenation catalyst and exposed to a high temperature radiant heat source. The solid circles are values derived from the measured heat fluxes produced by the heat source, whereas the open circles are values based on the enthalpy difference between the products and reactants. At a temperature of 935° F., the heat sink capacities from decalin dehydrogenation are 1437 Btu/lb based on product distribution and 1454 Btu/lb based on heat flux. These values are over 800 Btu/lb greater that the heat sink provided by RP-2 at the same temperature. The FIGURE shows that RP-2 must be heated to approximately 1350° F. in order to produce a heat sink capacity of 1460 Btu/lb from thermal cracking reactions. However, at this temperature the products produced in thermal cracking reactions cause carbon deposits to form rapidly in the fuel flow paths, which can lead to catastrophic failure. On the other hand, the products of decalin dehydrogenation, naphthalene and hydrogen, are stable at high temperatures, and therefore more cooling capacity can be obtained from sensible heating of these compounds. As shown in the FIGURE, a heat sink capacity of 2100 Btu/lb is potentially available at a temperature of 1400° F. This represents an increase of 640 Btu/lb over the maximum heat sink that can be obtained from RP-2 and it can be obtained without danger of coke deposition.

We claim:

1. A fuel composition which comprises 50% or more by volume of a mixture of the cis and trans isomers of decahydronaphthalene, wherein the molar ratio of cis to trans isomers ranges from 3.5 to 1.0 and which optionally comprises 0-3% by volume of tetrahydronaphthalene, 0-3% by volume of naphthalene, 0-10% by volume of methyl alcohol, ethyl alcohol, n-propyl alcohol, or a mixture thereof, and 0-25% by volume of methylcyclohexane.

2. The fuel composition of claim 1 which comprises 75% or more by volume of the mixture of cis and trans isomers of decahydronaphthalene.

3. The fuel composition of claim 1 which comprises 90% or more by volume of the mixture of cis and trans isomers of decahydronaphthalene.

4. The fuel composition of claim 1 which comprises 97% or more by volume of the mixture of cis and trans isomers of decahydronaphthalene.

5. The fuel composition of claim 1 which comprises 99% or more by volume of the mixture of cis and trans isomers of decahydronaphthalene.

6. The fuel composition of claim 1 which comprises 0.01 to 3% by volume tetrahydronaphthalene.

7. The fuel composition of claim 1 which comprises 0.01 to 3% by volume naphthalene.

8. The fuel composition of claim 1 which comprises 0.01 to 10% by volume methylcyclohexane, methyl alcohol, ethyl alcohol, propyl alcohol or a mixture of two or more thereof.

9. The fuel composition of claim 1 which comprises 0.01 to 10% by volume methanol.

10. The fuel composition of claim 9 which comprises 0.005 to 2% by volume of cosolvent.

11. The fuel composition of claim 10, wherein the cosolvent is acetone, methyl ethyl ketone, n-propanol or n-butanol.

12. The fuel composition of claim 9 which comprises 0.01 to 25% by volume methylcyclohexane.

13. The fuel composition of claim 1 which comprises 0.01 to 25% by volume methylcyclohexane.

14. The fuel composition of claim 1, wherein the molar ratio of cis to trans decahydronaphthalene ranges from 2.0 to 1.5.

15. The fuel composition of claim 1, wherein the molar ratio of cis to trans decahydronaphthalene ranges from 2.0 to 1.5 and the freezing point of the fuel is −65° F. or less.

16. The fuel composition of claim 1, wherein the freezing point of the fuel is −40° F. or less.

17. The fuel composition of claim 1, wherein the freezing point of the fuel is −65° F. or less.

18. A fuel composition which comprises 50% or more by volume of a mixture of the cis and trans isomers of decahydronaphthalene, wherein the molar ratio of cis to trans isomers ranges from 10 to 0.1 and which comprises 0.1 to 10% by volume of methanol, ethanol, n-propanol or a mixture of any two thereof and/or 1 to 25% by volume of methylcyclohexane and which optionally comprises 0-3% by volume of tetrahydronaphthalene, and/or 0-3% by volume of naphthalene.

19. A method for operating a ramjet air breathing engine which comprises passing a fuel composition to the engine and combusting the fuel composition therein, wherein the fuel composition is a fuel composition of claim 1.

20. The method of claim 19 wherein passing the fuel composition to the engine comprises contacting the fuel with a catalyst that is active for dehydrogenation of decahydronaphthalene and thereafter sending the products of the dehydrogenation reaction to the combustor.

* * * * *

UNITED STATES PATENT AND TRADEMARK OFFICE
CERTIFICATE OF CORRECTION

Page 1 of 1

PATENT NO. : 11,111,448 B1
APPLICATION NO. : 16/277627
DATED : September 7, 2021
INVENTOR(S) : Bradley Dean Hitch et al.

It is certified that error appears in the above-identified patent and that said Letters Patent is hereby corrected as shown below:

In the Specification

Column 1, Line 5, insert:
--STATEMENT REGARDING FEDERALLY SPONSORED RESEARCH OR DEVELOPMENT
This invention was made with government support under Contract Nos. FA8650-13-M-2414 and FA8650-14-C-2526 awarded by the United States Air Force. The government has certain rights in this invention.--

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*